(12) United States Patent
Doerr

(10) Patent No.: US 9,140,854 B2
(45) Date of Patent: Sep. 22, 2015

(54) SPATIAL DIVISION MULTIPLEXING OPTICAL MODE CONVERTER

(71) Applicant: Alcatel-Lucent USA, Incorporated, Murray Hill, NJ (US)

(72) Inventor: Christopher Doerr, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 190 days.

(21) Appl. No.: 13/624,331

(22) Filed: Sep. 21, 2012

(65) Prior Publication Data
US 2013/0077911 A1 Mar. 28, 2013

Related U.S. Application Data

(60) Provisional application No. 61/537,972, filed on Sep. 22, 2011.

(51) Int. Cl.
*G02B 6/00* (2006.01)
*G02B 6/12* (2006.01)
*G02B 6/293* (2006.01)

(52) U.S. Cl.
CPC ........ *G02B 6/12009* (2013.01); *G02B 6/29302* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 5,127,733 A | 7/1992 | Allgauer | |
| 5,357,591 A | 10/1994 | Jiang et al. | |
| 5,621,715 A | 4/1997 | Ohyama | |
| 5,933,120 A | 8/1999 | Manasson et al. | |
| 6,534,429 B1 | 3/2003 | Jackson | |
| 6,535,678 B1 | 3/2003 | Yamauchi et al. | |
| 6,594,429 B1 | 7/2003 | White | |
| 6,711,334 B2 | 3/2004 | Szkopek et al. | |
| 6,782,148 B2 | 8/2004 | Eggleton et al. | |
| 6,915,077 B2 * | 7/2005 | Lo | 398/47 |
| 6,956,987 B2 | 10/2005 | Doerr | |
| 7,027,703 B2 | 4/2006 | Joyner et al. | |
| 7,130,518 B2 | 10/2006 | Yamazaki | |
| 7,184,627 B1 | 2/2007 | Gunn, III et al. | |

(Continued)

FOREIGN PATENT DOCUMENTS

CN 1629662 A 6/2005
EP 0360209 A2 3/1990

(Continued)

OTHER PUBLICATIONS

Chen, X., et al., "Polarization-Independent Grating Couplers for Silicon-on-Insulator Nanophotonic Waveguides," Optics Letters, Feb. 8, 2011, 4 pages.

(Continued)

*Primary Examiner* — Sung Pak
(74) *Attorney, Agent, or Firm* — Hitt Gaines, P.C.

(57) ABSTRACT

Embodiments provide an optical device that includes a star coupler, a polarization bam splitter (PBS) and a polarization rotator. The star coupler includes a port at a first end face. The polarization beam splitter is optically coupled via a first side to the star coupler port, and is further optically coupled via a second side to a first port of an optical coupler. The polarization rotator is optically coupled between the polarization beam splitter and a second port of the optical coupler.

21 Claims, 8 Drawing Sheets

(56) References Cited

U.S. PATENT DOCUMENTS

| | | |
|---|---|---|
| 7,317,857 B2 | 1/2008 | Manyam et al. |
| 7,343,066 B2 * | 3/2008 | Doerr et al. .................... 385/27 |
| 7,376,309 B2 | 5/2008 | Gulde |
| 7,424,195 B2 | 9/2008 | Andrieu et al. |
| 7,474,825 B1 | 1/2009 | Horst et al. |
| RE41,570 E | 8/2010 | Greiner et al. |
| RE42,540 E | 7/2011 | Iazikov et al. |
| RE43,223 E | 3/2012 | Stimak et al. |
| RE43,226 E | 3/2012 | Iazikov et al. |
| 2003/0174985 A1 | 9/2003 | Eggleton et al. |
| 2005/0100300 A1 | 5/2005 | Joyner et al. |
| 2005/0147355 A1 | 7/2005 | Ilchenko |
| 2006/0127024 A1 | 6/2006 | Smith et al. |
| 2006/0285795 A1 | 12/2006 | Fondeur |
| 2007/0019905 A1 | 1/2007 | Mahrt et al. |
| 2007/0201796 A1 * | 8/2007 | Gulde .............................. 385/39 |
| 2008/0142828 A1 | 6/2008 | Yang |
| 2010/0209045 A1 | 8/2010 | Okayama |
| 2010/0329670 A1 | 12/2010 | Essiambre et al. |
| 2010/0329671 A1 | 12/2010 | Essiambre et al. |
| 2011/0243574 A1 | 10/2011 | Essiambre et al. |
| 2012/0170933 A1 | 7/2012 | Doerr et al. |
| 2012/0183304 A1 | 7/2012 | Winzer et al. |
| 2012/0224805 A1 | 9/2012 | Doerr |
| 2012/0224810 A1 | 9/2012 | Doerr |
| 2012/0251126 A1 | 10/2012 | Winzer et al. |
| 2013/0209022 A1 * | 8/2013 | Doerr ................................ 385/3 |

FOREIGN PATENT DOCUMENTS

| | | |
|---|---|---|
| EP | 0419257 A2 | 3/1991 |
| EP | 0709938 A2 | 1/1996 |
| JP | 62187310 A | 8/1987 |
| JP | 63-150981 | 6/1988 |
| JP | 02191916 | 7/1990 |
| JP | 3246510 A | 11/1991 |
| JP | 05218378 A | 8/1993 |
| JP | H06281824 A | 10/1994 |
| JP | 07335855 | 12/1995 |
| JP | 09218318 | 8/1997 |
| JP | 11134696 | 5/1999 |
| WO | 2010117881 A1 | 10/2010 |
| WO | 2012121859 A2 | 9/2012 |

OTHER PUBLICATIONS

Curtis, J. E., et al., "Dynamic Holographic Optical Tweezers," Opt. Communications, Apr. 17, 2002, p. 169 et seq.

Doerr, C., et al., "Circular grating coupler for creating focused azimuthally and radially polarized beams," Optics Letters, vol. 36, No. 7, Apr. 1, 2011, p. 1209-1211.

Doerr, C., "360 Star Coupler for Detecting Subwavelength Features," IEEE Photonics Technology Letters, vol. 20, No. 17, Sep. 1, 2008, p. 1440-1442.

Dorn, R., et al., "Sharper Focus for a Radially Polarized Light Beam," Physical Review Letters, vol. 91, No. 23, Dec. 5, 2003, pp. 233901-1-233901-4.

Dragone, C., "Optimum design of a planar array of tapered waveguides," Optical Society of America, vol. 7, No. 11, Nov. 1990, pp. 2081-2093.

Dragone, C., "Efficient N × N Start Coupler Based on Fourier Optics," Electronics Letters, vol. 24, No. 15, Jul. 21, 1988, pp. 942-944.

Gloge, D., et al., "Impulse Response of Fibers With Ring-Shaped Parabolic Index Distribution," The Bell System Technical Journal, vol. 52, No. 7, Sep. 1973, pp. 1161-1168.

Gupta, D.N., et al., "Electron acceleration to GeV energy by a radially polarized laser," Physics Letters A, Science Direct, 2007, pp. 402-407.

Ibanescu, M., et al., "An All-Dielectric Coaxial Waveguide," Science 289, Jul. 2000, pp. 415-419.

Jordan, R. H., et al., "Lasing behavior of circular grating surface-emitting semiconductor lasers," Optical Society of America, vol. 14, No. 2, Feb. 1997, pp. 449-453.

Kitamura, K., et al., "Sub-wavelength focal spot with long depth of focus generated by radially polarized, narrow-width annular beam," Optics Express, vol. 18, No. 5, Mar. 1, 2010, pp. 4518-4525.

Kogelnik, H., et al., "Laser Beams and Resonators," Proceedings of the IEEE, vol. 54, No. 10, Oct. 1966, pp. 1312-1329.

Kogelnik, H., "Theory of Optical Waveguides," Guided-Wave Optoelectronics, Springer-Verlag, Berlin, 1990, pp. 12-17.

Lee, B. G., et al., "120-Gb/s 100-m Transmission in a Single Multicore Multimode Fiber Containing Six Cores Interfaced with a Matching VCSEL Array," IEEE, 2010, pp. 223-224.

Loudon, R., "The Quantum Theory of Light," Oxford University, 1973, Chapter 8, pp. 172-173.

Mekis, A., et al., "A Grating-Coupler-Enabled CMOS Photonics Platform," IEEE Journal of Selected Topics in Quantum Electronics, vol. 17, No. 3, 2010, 12 pages.

Miyai, E., et al., "Lasers producing tailored beams," Nature, vol. 44, Jun. 22, 2006, p. 946.

Mushiake, Y., et al., "Generation of Radially Polarized Optical Beam Mode by Laser Oscillation," IEEE, Jun. 1972, pp. 1107-1109.

Noda, S., et al., "Polarization Mode Control of Two-Dimensional Photonic Crystal Laser by Unit Cell Structure Design," Science, vol. 293, Aug. 10, 2001, pp. 1123-1125.

Passilly, N., et al., "Simple interferometric technique for generation of a radially polarized light beam," Optical Society of America, vol. 22, No. 5, May 2005, pp. 984-991.

Ryf, R., et al., "Space-division multiplexing over 10km of three-mode fiber using coherent 6X6 MIMO processing," Optical Fiber Communication Conference (OFC), Mar. 8, 2011, 3 pages.

Whitesides, G. M., "The Origins and the future of microfluidics," Nature Publishing Group, 2006, vol. 442, pp. 368-373.

Zurita-Sanchez, J. R., et al., "Multipolar interband absorption in a semiconductor quantum dot. II Magnetic dipole enhancement," J. Optical Society of America, vol. 19, No. 11, 2002, pp. 2722-2726.

Zurita-Sanchez, J. R., et al., "Multipolar interband absorption in a semiconductor quantum dot. I Electric quadrupole enhancement," Optical Society of America, vol. 19, No. 6, Jun. 2002, pp. 1355-1362.

* cited by examiner

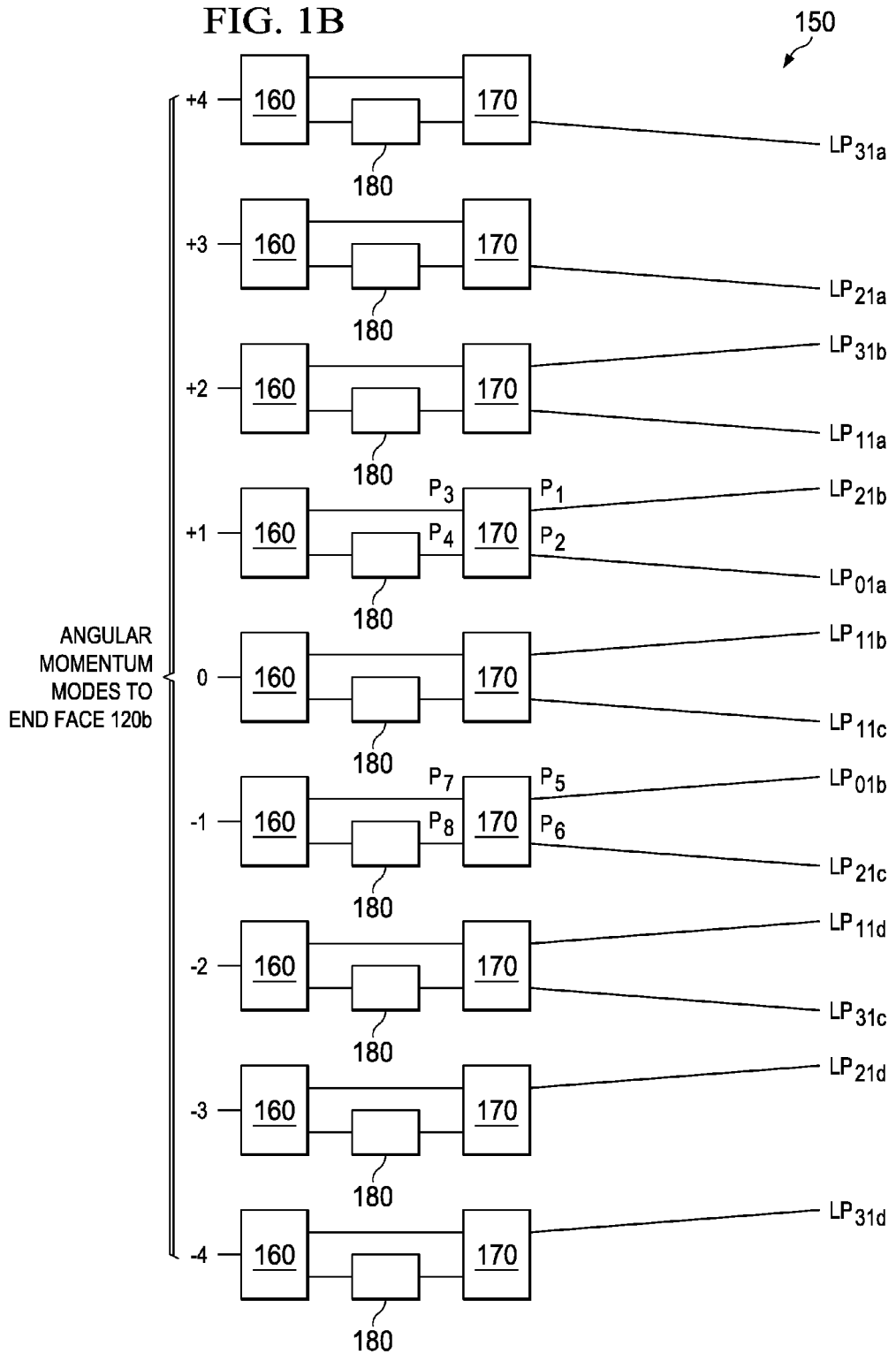

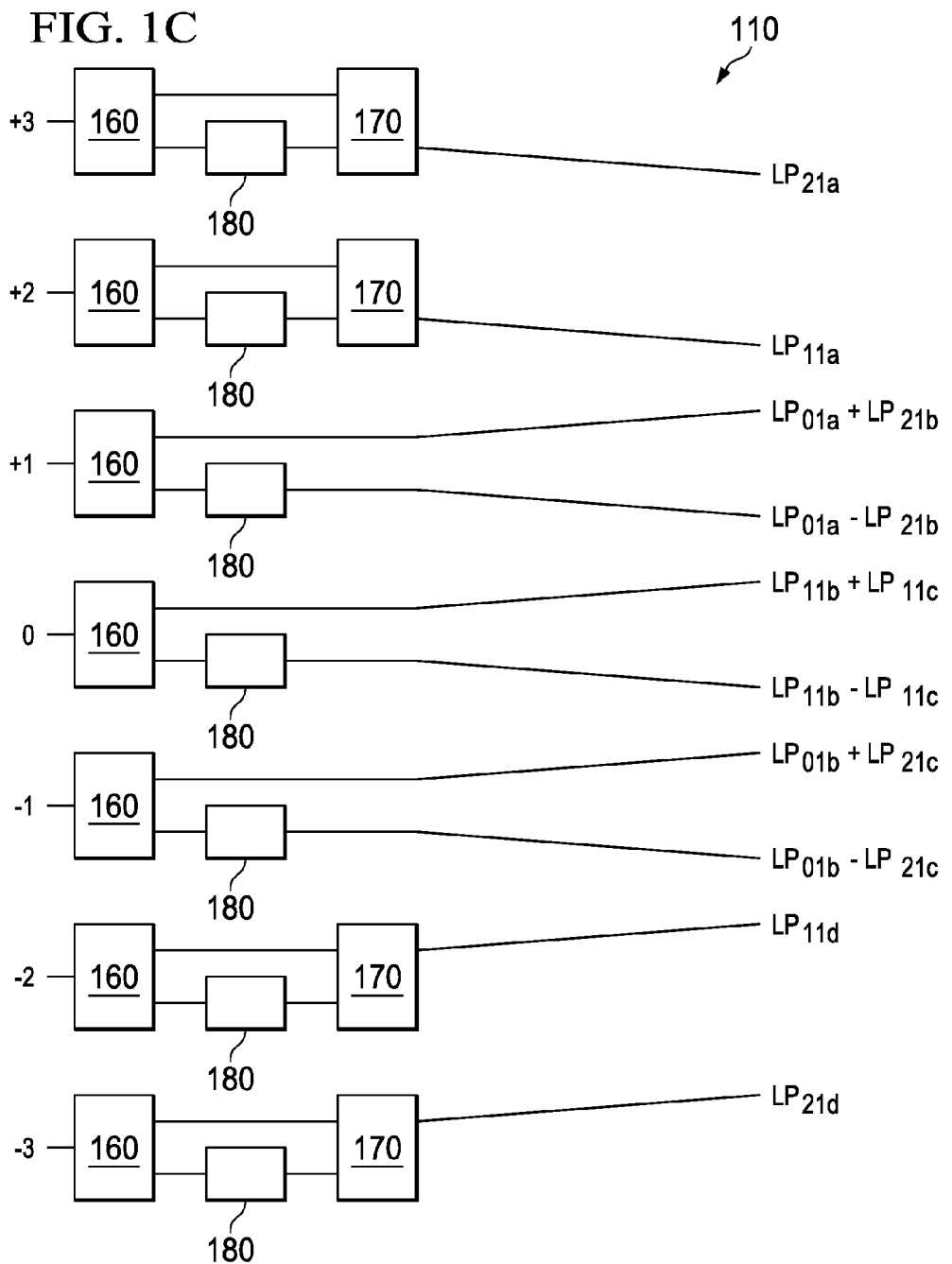

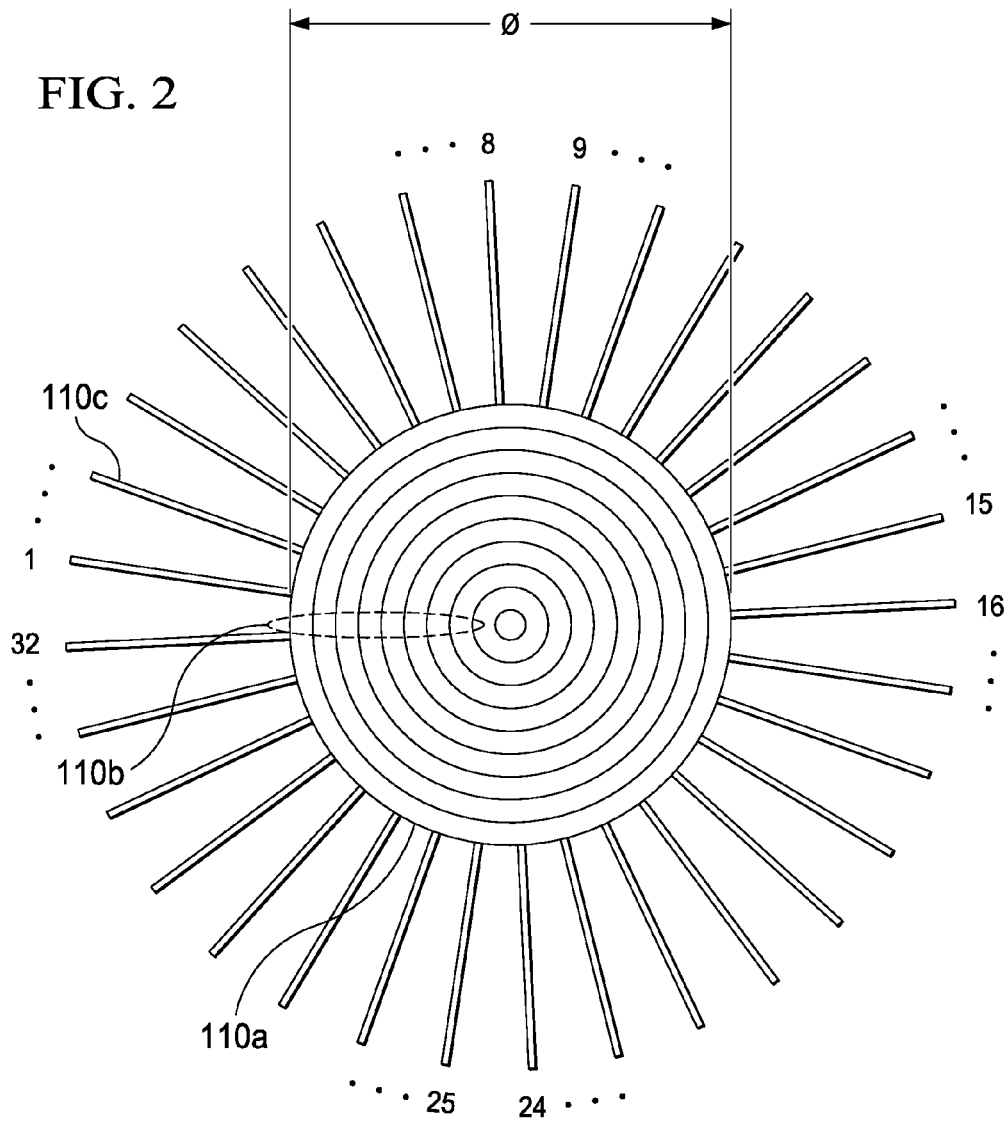

SPATIAL DIVISION MULTIPLEXING OPTICAL MODE CONVERTER

CROSS-REFERENCE TO RELATED APPLICATION

This application claims the benefit of U.S. Provisional Application Ser. No. 61/537,972, filed by Christopher R. Doerr on Sep. 22, 2011, entitled "SPATIAL DIVISION MULTIPLEXING OPTICAL MODE CONVERTER," commonly assigned with this application and incorporated herein by reference.

TECHNICAL FIELD

This application is directed, in general, to optical devices and methods of manufacturing and using optical devices.

BACKGROUND

This section introduces aspects that may be helpful to facilitating a better understanding of the inventions. Accordingly, the statements of this section are to be read in this light and are not to be understood as admissions about what is in the prior art or what is not in the prior art.

In an optical communication system, a series of one or more spans of optical fiber typically carries data from an optical transmitter to an optical receiver. The optical fiber may be fabricated to have one or multiple propagation modes for light having a wavelength in ordinary optical telecommunication bands, e.g., the optical S-band, C-band or L-band. In a multi-mode optical fiber, multiple propagation modes are available, and each of the propagation modes may carry a different data stream. Thus, a multi-mode optical fiber may be able to support a larger data transmission rate in a given frequency band than a single-mode optical fiber.

SUMMARY

Various embodiments provide an optical device that includes a star coupler, a polarization beam splitter (PBS) and a polarization rotator. The star coupler includes a port at a first end face. The polarization beam splitter is optically coupled via a first side to the star coupler port, and is further optically coupled via a second side to a first port of an optical coupler. The polarization rotator is optically coupled between the polarization beam splitter and a second port of the optical coupler.

Any embodiment above may further include a circular grating coupler that has a plurality of radial ports coupled to the star coupler at a second end face. Some such embodiment may include a laser coupled to the circular grating coupler via a tubular-core optical fiber.

Another embodiment provides an optical device that includes a circular grating coupler, a star coupler and plurality of polarization beam splitters. The circular grating coupler has a plurality of radial ports to which the star coupler is connected via a first end face. The polarization beam splitters are each optically coupled via a first end to a second end face of the star coupler. Each polarization beam splitter is optically coupled via a second end to one of a corresponding plurality of optical couplers.

Yet another embodiment provides an optical device that includes a circular grating coupler and a star coupler having an end face. A plurality of waveguides connects the end face to the circular grating coupler. The circular grating coupler has $2^n$ input ports. The waveguides are routed from the end face to the input ports in groups having an integer multiple of two associated members. The number of associated waveguides in each group sequentially decreases from the end face to the circular grating coupler input ports.

Various embodiments may include a plurality of polarization rotators, with each polarization rotator being coupled to a corresponding polarization beam splitter and a corresponding optical coupler. In various embodiments the circular grating coupler, star couplers, polarization beam splitters and polarization rotators may be formed from a silicon layer. In various embodiments channel, rib, and/or ridge waveguides connect the circular grating coupler to the star coupler.

Some embodiments include a tubular-core fiber optically coupled to the circular grating coupler. Some such embodiments further include a laser configured to couple an optical signal to the tubular-core fiber. In various embodiments the laser is further configured to provide light in an optical S, C or L band. In various embodiments multiple propagation modes of the fiber are mapped to a single angular momentum mode of the circular grating coupler.

In some embodiments the plurality of polarization beam splitters is a first plurality of polarization beam splitters. Such embodiments may include a second plurality of polarization beam splitters connected to the second end face. In such embodiments a total number of the first and second pluralities of polarization beam splitters may exceed a number of the optical couplers.

Various embodiments provide a method, e.g. for forming an optical device. A circular grating coupler is formed that has a plurality of radial ports. A star coupler is connected via a first end face to the radial ports. A plurality of polarization beam splitters is formed such that each of the polarization beam splitters is coupled via a first end to a second end face of the star coupler. Each polarization beam splitter is optically coupled via a second end to an optical coupler.

In any embodiment of the method each of a plurality of polarization rotators may be connected between a corresponding one of the polarization beam splitters and a corresponding one of the optical couplers. Any embodiment may include optically coupling a tubular-core optical fiber to the circular grating coupler. In such embodiments a laser may be configured to output an optical signal to the tubular-core fiber. The laser may be configured to provide light in an optical S, C or L band.

BRIEF DESCRIPTION

Reference is made to the following descriptions taken in conjunction with the accompanying drawings, in which:

FIG. 1B illustrates the PIC channel interface of FIG. 1A according to a first embodiment, including light from or for a plurality of angular momentum channels, wherein each polarization rotator is connected between a corresponding one of a plurality of polarization beam splitters and a corresponding one of a plurality of 2×2 optical couplers;

FIG. 1C illustrates the channel interface of FIG. 1A according to a second embodiment, wherein some of the optical couplers of the embodiment of FIG. 1B are omitted from some of the plurality of PIC channels some orthogonal angular momentum channels are combined to a single PIC channel;

FIG. 2 illustrates the circular grating coupler of FIG. 1A according to one embodiment;

DETAILED DESCRIPTION

In various embodiments described herein and otherwise within the scope of the disclosure, space-division multiplexing (SDM) is used to transmit data using multiple orthogonal propagation modes of a multimode fiber (MMF). SDM can be used to increase the capacity of a single fiber or increase photon efficiency. However, to better exploit SDM, the complete set of fiber eigenmodes typically should be preferably independently addressed at the transmitter and/or extracted at the receiver. Conventional implementations typically use free-space optics, including spatial light modulators and phase plates. Such devices are typically expensive and require careful optical alignment to ensure proper operation.

In various embodiments, light may be substantially separately end-coupled to selected ones of the propagation modes of the MMF using a PIC. One way to create the large optical pattern needed to selectively end-couple into and out of individual selected ones of the MMF modes is to end-couple the MMF perpendicular to the PIC surface. Surface coupling can be achieved using a circular grating coupler with radially-oriented ports. By adjusting the relative phase of light delivered to different ones of the radial ports, light patterns with azimuthally varying relative phase and/or amplitude may be produced within the MMF. For example, the phase of the light's optical field may be adjusted to vary linearly with azimuthal angle around the circumference of the circular grating. Conversely, optical signals propagating within the MMF in some propagating modes have optical fields whose amplitude and/or phase vary azimuthally, and light of selected ones of the modes may be coupled to the circular grating coupler and distributed over a PIC for further optical processing.

In some embodiments described herein the MMF is a tubular-core fiber (TCF), which may also be referred to as a ring-core fiber. At a given frequency of light, the TCF may be specially constructed to support a special orthogonal basis of propagating modes. In an orthogonal basis of the specially constructed TCF, each propagating mode is an eigenvector of the "angular momentum" that is conjugate to the azimuthal angle about the axis of the MMF. Angular momentum is defined and described further below. For the orthogonal basis of the specially constructed TCF, the one or more modes with a given angular momentum have the same radial intensity profile. That is, there may be two propagating modes of a given angular momentum, but such modes only differ in polarization, i.e., the local light intensities therein are the same. As described below, this results in a mutually orthogonal basis set of propagation modes that may be easily used to simultaneously transmit independent data streams to different orthogonal propagation modes, e.g., without substantial mixing.

Figure 1A:
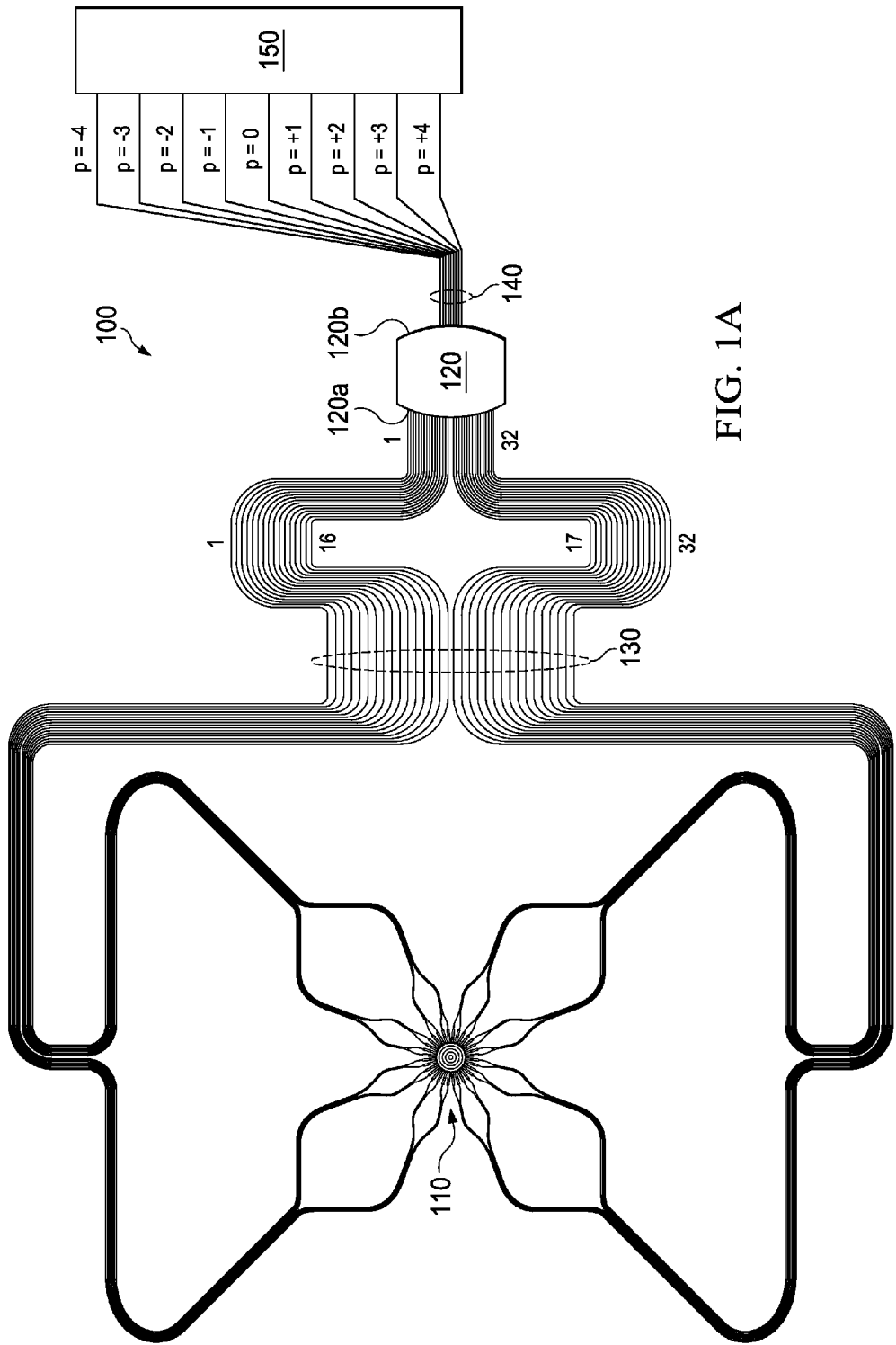
FIG. 1A illustrates a portion of an optical system according to one embodiment, including a star coupler connected to a circular grating coupler via a first set of waveguides and connected to a photonic integrated circuit (PIC) channel interface configured to modify the propagation characteristics of optical signals propagating between the circular grating coupler and the channel interface.

Turning initially to FIG. 1A, aspects are illustrated of various embodiments of an optical communication system 100. A circular grating coupler 110 is optically coupled to a star coupler 120 via waveguides 130. The star coupler 120 is optically coupled via waveguides 140 to a PIC channel interface 150. The PIC channel interface 150 includes PIC channel outputs, shown without limitation as being designated −4 . . . 0 . . . +4. This aspect is described further below.

The circular grating coupler 110 is shown in FIG. 2 in more detail. Aspects of the grating coupler 110 are described in detail in U.S. patent application Ser. Nos. 13/041,366 (the '366 application) and 13/077,149 (the '149 application), both to Christopher Doerr and both incorporated herein by reference. The grating coupler 110 includes a central region 110a having a diameter Ø and includes multiple concentric circular waveguide loops 110b, e.g. circular ridges. The grating coupler 110 also includes a plurality of radial ports 110c. The illustrated embodiment includes 32 radial ports 110c that may receive light from and deliver light to the edge of the central region 110a. The number of such ports is not limited to any particular number, but an integer power of 2 may be preferred for some applications. The radial ports 110c are labeled for reference from 1 through 32 as indicated in FIG. 2. The radial ports 110c may be referred to herein by number, e.g. 110c-1 through 110c-32.

The star coupler 120 is designed to be M×M, where M is the number of radial ports 110c, e.g. 32. Thus the power received at the end face 120b is ideally split equally among all the waveguides 130. The phase at each waveguide 130 equals, ideally, $\phi = 2\pi p[m-(M+1)/2]/M$ where m is the waveguide number (1, 2, . . . 32) and p is the input/output port number (−15, −14, . . . , 14, 15). (Each I/O port number corresponds to one of the PIC channels, e.g. −4 . . . 0 . . . 4 in the illustrated embodiment). Each input/output port imparts an angular momentum "p" to the beam emanating from the circular coupler 110. The angular momentum p is also designated by the port number. Thus, e.g. port numbers −4 . . . 0 . . . +4 impart a corresponding angular momentum of p=−4 . . . 0 . . . +4 to the emanating beam. This aspect is addressed in greater detail below.

Referring to FIG. 1A, the radial ports 110c are optically coupled, e.g. connected, to a first end face 120a of the star coupler 120 via the waveguides 130. The ports of the end face 120a are numbered 1 through 32, corresponding to the designation of the radial ports 110c.

In FIG. 1A, the waveguides 130 are configured to have about a same physical path length. This may simplify some aspects of system design, e.g. ensuring a same optical path length of the waveguides 130. In the illustrated embodiment the waveguides are divided into groups having $2^n$ members, where n=1, 2, 3, 4. Thus, starting from the face 120a of the star coupler 120 the waveguides are arranged as two groups of 16 parallel waveguides. The members of each group follow a path designed to be about equal in length to the others of the group. The waveguide groups each split into two groups of eight. The waveguides within each eight-member group again each follow paths having about equal lengths and then split again into groups having four members. The waveguides similarly split into groups of two, and then single waveguides at the circular grating coupler 110. In this manner, the waveguides 130 are routed in groups having an integer multiple of two ($2^n$) associated members, with the number of associated waveguides in each group sequentially decreasing from the face 120a to the circular grating coupler 110. The device 100 may optionally include heater elements (not shown) that may be used to fine-tune the optical path lengths of the waveguides 130 to be about equal, e.g., to correct for manufacturing tolerances.

The waveguides 140 connect the PIC channel interface 150 to the second end face 120b of the star coupler 120. The waveguides 140 are not limited to any particular number. In the illustrated embodiment, there are an odd number, e.g. nine, waveguides 140. Each waveguide 140 is associated with one of the input ports −4 . . . 0 . . . +4 as illustrated. The input port number associated with each waveguide 140 is described in detail, e.g. in the '366 and '149 applications and briefly summarized here.

As described previously, the phase of the light provided to the radial ports 110c may be adjusted or set to end-couple light therebetween with selected propagating modes of an MMF. When an optical signal is end-coupled from the grating coupler 110 to an optical fiber, the phase of the light to the radial ports 110c is determined by the port p at the second end face 120b to which the optical signal is delivered. The end face ports are configured such that when light is input to the port 0 the light is distributed to the radial ports 110c with essentially no phase difference around the central region 110a. When the light is input to the port +1, the light is distributed to the radial ports 110c such that the phase of the light increases about linearly around the central region 110a from one port 110c to the next neighboring port 110c for a total of $2\pi-\pi/16$. For example, the phase at the ports 110c-1, 2 and 3 may be 0, $\pi/16$, and $\pi/8$, respectively, with the phase increasing by increments $\pi/16$ to the port 110c-32, at which the phase is $15\pi/16$. (It is understood that the scope of the disclosure includes embodiments in which the phase values are about equal to a corresponding integer multiple of a phase increment.) Similarly, light input to the port 2 of the star coupler 120 is distributed to the radial ports 110c with a total phase change of $4\pi-\pi/8$ from the radial port 110c-1 to the radial port 110c-32. When the number of the port at the second end face 120b is positive, the phase increases in a clockwise direction around the central region 110a. Conversely, when the number of the port is negative, the phase increases linearly around the edge of the central region 110a in a counterclockwise direction.

More generally, the phase change from the radial port 110c-1 to the radial port 110c-32 and back to the port 110c-1 is equal to about $p*2\pi$. In other words, the angular momentum is the number of cycles of $2\pi$ that the input signal provided to the grating coupler 110 increases in phase around the central region 110a of the circular grating coupler 110. That is, a propagating mode with angular momentum p has an azimuthal dependency of the form $\exp(j\theta)$ where $\theta$ is the azimuthal angle, which is in the interval $[0, 2\pi]$. As discussed below, light received by the grating coupler 110 may also be characterized by angular momentum.

Figure 3:
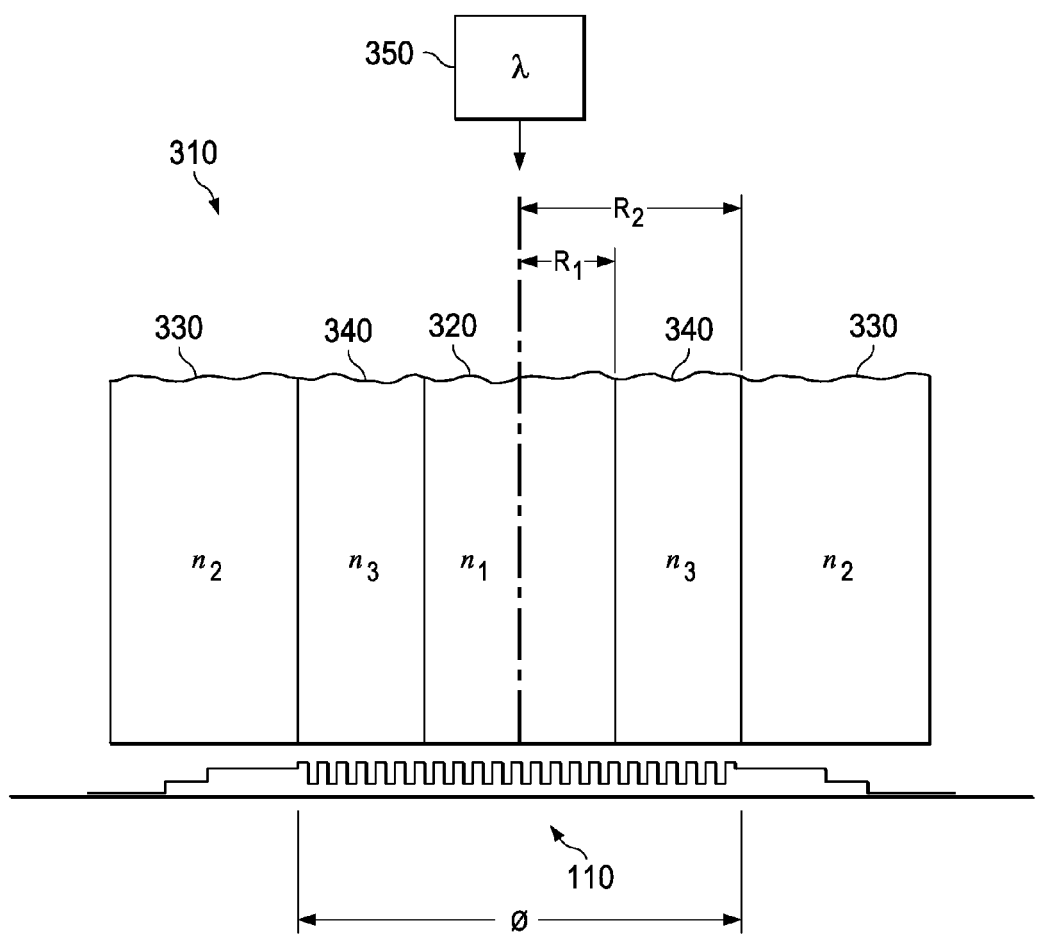
FIG. 3 is a cross-sectional view illustrating according to one embodiment a tubular-core optical fiber positioned to be optically end-coupled to the circular grating coupler in FIGS. 1A and 2.

FIG. 3 illustrates a sectional view of the circular grating coupler 110 and an optical fiber 310 located thereover. An optical source 350, e.g. a laser, is configured to provide, in some embodiments, an optical signal to the optical fiber 310. In various embodiments the optical signal may have a wavelength $\lambda$ in the S, C or L optical communication bands. The fiber 310 is located such that an optical signal may be coupled between the fiber 310 and the grating coupler 110. The coupling is symmetric, such that a signal may be coupled from or to the fiber 310. In various embodiments, including the illustrated embodiment, the fiber 310 is a TCF. The fiber 310 includes a central cladding region 320 with a refractive index (RI) $n_1$ and an outer cladding region 330 with an RI $n_2$. The refractive indexes $n_1$ and $n_2$ may be equal, but need not be. A core region 340 with an inner radius $R_1$ and an outer radius $R_2$ is located between the cladding regions 320 and 330. The core region 340 has a refractive index $n_3$ that is higher than $n_1$ and $n_2$, so an optical signal is substantially confined within the core region 340. In some embodiments the central region 110a of the grating coupler is designed to focus via chirping of the grating period, such as when, e.g. the diameter $\varnothing$ (FIG. 2) is greater than $R_2$.

The geometry of the core region 340, e.g. an annular cross-section, constrains the modes of optical signals that propagate therein. The condition to be single-mode radially is believe to be:

$$R_2-R_1 < \lambda/(2\sqrt{n_2^2-n_1^2}).$$

The number of guided azimuthal modes (including polarization) is believe to be about $$N = \text{floor}\left[\frac{\pi}{2}\sqrt{b(n_2^2-n_1^2)(R_1+R_2)}\right]4+2,$$

where b is determined by solving the transcendental equation $$\pi(R_2-R_1)\sqrt{n_2^2-n_1^2}\sqrt{1-b} = \lambda \tan^{-1}\sqrt{b/1-b}.$$

In an illustrative and nonlimiting embodiment, the fiber 310 is characterized by $R_1 \approx 5.25$ μm, $R_2 \approx 10.5$ μm, $R_3 \approx 21$ μm, $n_1 \approx 1.45$, and $n_2 1.45 \times 1.0026$. Under these conditions the fiber 310 may support 10 modes at $\lambda \approx 1545$ nm.

Figure 4:
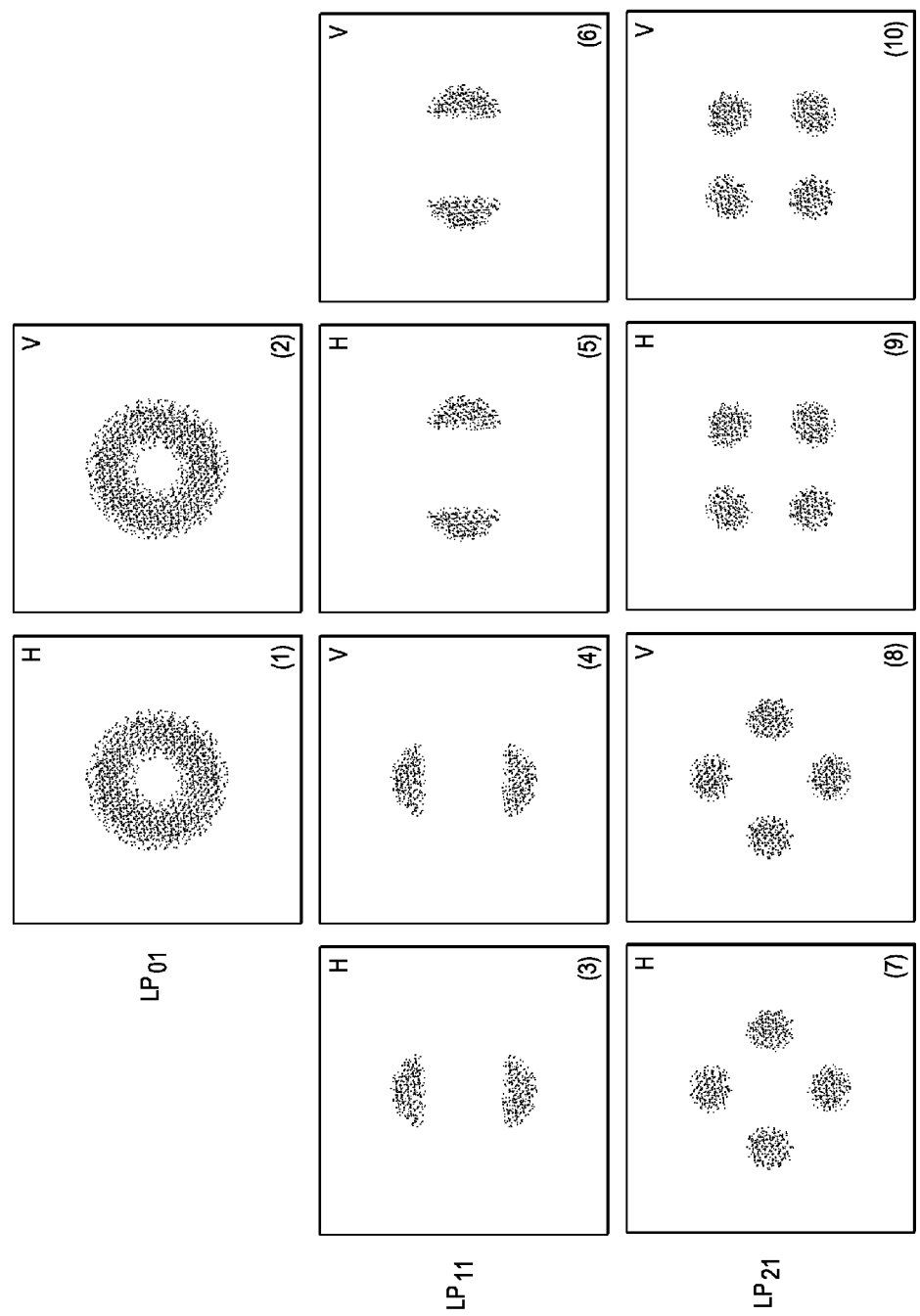
FIG. 4 illustrates calculated E-field intensity profiles of various propagation modes of a tubular-core optical fiber.

FIG. 4 illustrates modeled E-field power and direction in a plane normal to the direction of light propagation in the optical fiber 310. The figure includes ten plates (1)-(10), representing ten propagating linear polarization (LP) modes within the optical fiber 310. Each row of plates represents an approximate mode set $LP_{mn}$, where m is the number of the azimuthal mode ($m \geq 0$), and n is the number of the radial mode ($n \geq 1$). In the embodiment under consideration n is geometrically constrained to be unity by the value of $R_2-R_1$.

The number of azimuthal modes is not so constrained. The first three allowable mode sets in the illustrated embodiment are $LP_{01}$, $LP_{11}$ and $LP_{21}$. While the described embodiment employs a TCF, other embodiments of the disclosure contemplate the use of a typical MMF, e.g. having a non-tubular core. However, a solid core fiber may not constrain the radial modes to a single mode, so the tubular-core fiber may be preferred in some cases.

In FIG. 4, the illustrated mode sets includes one pair of degenerate propagating modes, plates (1) and (2), and two quadruplets of degenerate modes, plates (3)-(6) and plates (7)-(10). A mode set $LP_{01}$ includes plate (1) and plate (2), a mode set $LP_{11}$ includes plates (3)-(6), and a mode set $LP_{21}$ includes plates (7)-(10). The propagation constants of the light signal within each mode set are the same, e.g. the propagation speed is the same. Each mode set includes one or two pairs of nominally identical E-field intensity maps. Within each pair one plate is associated with a horizontally (H) polarized E-field, and the other is associated with a vertically (V) polarized E-field.

The propagating modes of FIG. 4 form a basis set of eigenmodes available to form propagation modes on the fiber 310 for several data channels, referred to herein as channel propagation modes. In a nonlimiting and illustrative example, Table I illustrates the relationship between true fiber propagation modes and angular momentum modes. Each fiber mode is excited by at least four angular momentum modes. For example, a fiber mode $LP_{01a}$ is excited by angular momentum modes ±1 using TE and TM polarized input light. The angular momenta indexes in Table I correspond to the ports at the end face 120b of the star coupler 120. While the mapping between the fiber 310 and the end face 120b is bidirectional, the following description is presented without limitation in terms of a signal input to the end face 120b and coupled to the fiber 310.

TABLE I

| Fiber Mode | # | TE Polarized AM |  |  |  |  |  |  | TM Polarized |  |  |  |  |  |  |
|---|---|---|---|---|---|---|---|---|---|---|---|---|---|---|---|
|  |  | −3 | −2 | −1 | 0 | +1 | +2 | +3 | −3 | −2 | −1 | 0 | +1 | +2 | +3 |
| $LP_{01a}$ | 1 |  |  | −j |  | j |  |  |  |  | 1 |  | 1 |  |  |
| $LP_{01b}$ | 2 |  |  | 1 |  | 1 |  |  |  |  | j |  | −j |  |  |
| $LP_{11a}$ | 3 |  | 1 |  | 2 |  | 1 |  |  |  | j |  | j |  | −j |
| $LP_{11b}$ | 4 |  | −j |  |  |  | j |  |  |  | 1 |  | 2 |  | 1 |
| $LP_{11c}$ | 5 |  | −j |  |  |  | j |  |  |  | j |  | −2 |  | 1 |
| $LP_{11d}$ | 6 |  | 1 |  | −2 |  | 1 |  |  |  | 1 |  |  |  | −j |
| $LP_{21a}$ | 7 | 1 |  | 1 |  | 1 |  | j |  | −j |  | j |  |  |  | −j |
| $LP_{21b}$ | 8 | −j |  | j |  | −j |  | j |  | 1 |  | 1 |  | 1 |  | 1 |
| $LP_{21c}$ | 9 | −1 |  | 1 |  | 1 |  | −1 |  | −j |  | −j |  | j |  | j |
| $LP_{21d}$ | 10 | j |  | j |  | −j |  | −j |  | −1 |  | 1 |  | 1 |  | −1 |

The first fiber mode in Table I, fiber mode #1, corresponds to the true fiber mode illustrated in plate (1). To excite the fiber mode #1, a combination of transverse-electric (TE) and transverse-magnetic (TM) light may be presented at the ±1 inputs to the end face 120b. The TE-polarized light at the −1 and +1 inputs are respectively weighted by −j and +j. The TM-polarized light at the −1 and +1 inputs are weighted by unity. Similarly the fiber mode #2 (plate (2)) may be excited by weighting TM light at the −1 and +1 inputs by j and −j, respectively, and weighting TE light at these inputs by unity. Higher order fiber propagating modes may be excited by inputting weighted TE and TM light at the end face 120b inputs as further described in Table I.

In some cases it may be inconvenient to provide light at multiple inputs to the end face 120b. However, noting that the fiber modes are mutually orthogonal, they may be used as a basis set from which orthogonal linear combinations may be formed. Linear combinations may be made that eliminate all but one of the angular momentum inputs. Thus, appropriately configured light input to a single end face 120b input may excite multiple fiber propagation modes in the fiber 310. Data channels transmitted on each of multiple inputs to the end face 120b are expected to remain orthogonal, and the integrity of data on the channels should be maintained. However, in some cases the energy distribution of a given signal among the fiber modes may be redistributed during propagation due to fiber imperfections, fiber bending, and/or stresses on the fiber.

Table II presents a mapping of angular momentum modes that result when the weighting matrixes of Table I are diagonalized. Two true fiber propagation modes of the basis set are mapped to a singular angular momentum mode of the circular grating coupler 110. But in each case of Table II light need only be input to a single one of the end face 120b inputs.

TABLE II

| Mode # | TE Polarized |  |  |  |  |  |  | TM Polarized |  |  |  |  |  |  |
|---|---|---|---|---|---|---|---|---|---|---|---|---|---|---|
|  | −3 | −2 | −1 | 0 | +1 | +2 | +3 | −3 | −2 | −1 | 0 | +1 | +2 | +3 |
| 1 |  |  |  |  | j |  |  |  |  |  |  | 1 |  |  |
| 2 |  | 1 |  |  |  |  |  |  |  | j |  |  |  |  |
| 3 |  |  |  | j |  |  |  |  |  |  |  |  | 1 |  |
| 4 |  |  | 1 |  |  |  |  |  |  |  |  | j |  |  |
| 5 |  |  | j |  |  |  |  |  |  |  |  | 1 |  |  |

TABLE II-continued

| Mode # | TE Polarized |  |  |  |  |  |  | TM Polarized |  |  |  |  |  |  |
|---|---|---|---|---|---|---|---|---|---|---|---|---|---|---|
|  | −3 | −2 | −1 | 0 | +1 | +2 | +3 | −3 | −2 | −1 | 0 | +1 | +2 | +3 |
| 6 |  | 1 |  |  |  |  |  |  |  |  |  | j |  |  |
| 7 |  |  |  |  | j |  |  |  |  |  |  |  |  | 1 |
| 8 |  |  | 1 |  |  |  |  |  |  |  |  |  | j |  |
| 9 |  | j |  |  |  |  |  |  |  |  | 1 |  |  |  |
| 10 | 1 |  |  |  |  |  |  |  |  |  | j |  |  |  |

FIG. 1B illustrates one embodiment of the PIC mode interface 150 that implements the mapping of Table II. Each of a plurality of polarization beam splitters (PBS) 160 is connected via a first end to a corresponding one of the end face 120b inputs, e.g. an angular momentum mode input. Each of a plurality of 4-port optical couplers 170 (2 input ports and 2 output ports) is connected via a first port to a second end of a corresponding one of the PBS 160. Each of a plurality of polarization rotators (PR) 180 is connected between a corresponding one of the PBS 160 and a second port of a corresponding coupler 170, e.g. a 2×2 coupler. In various embodiments an instance of the PBS 160 and a corresponding instance of the PR 180 may be formed as a single optical component. As described below in some embodiments the couplers 170 may be omitted. A combination associated with an angular momentum mode of a PBS 160 and PR 180, and if present a coupler 170, is referred to as an angular momentum channel.

The following description of the operation of a polarization channel considers the angular momentum channels associated with angular momentum inputs −1 and +1. The coupler 170 associated with the angular momentum channel −1 has four ports $P_1$-$P_4$. Ports $P_1$ and $P_2$ are located at a first port side of the coupler 170, and ports $P_3$ and $P_4$ are located at a second port side. A signal input to $P_1$ is split into two portions, with a first portion output at the $P_3$, and a second portion at $P_4$ phase shifted by $\pi/2$ (j) relative to the output at $P_3$. Similarly, a signal input to $P_2$ is split between $P_3$ and $P_4$, with the output at $P_3$ being shifted by $\pi/2$ relative to $P_4$.

Thus, when a TE-polarized signal is input to $LP_{01a}$, the coupler 170 diverts a first portion to $P_4$ without a phase shift, and a second portion to $P_3$ with a $\pi/2$ phase shift. The PR 180 rotates the polarization of the first portion at $P_4$ from TE to TM and directs the first portion to the PBS 160. The PBS 160 receives the second portion without an intervening phase shift. The PBS 160 combines the TE and TM signals to a single output and directs the combined signal to input +1 of the star coupler end face 120a. The star coupler 120 provides at the end face 120a equal portions of the composite signal to the circular grating coupler 110 with an angular momentum of +1, e.g. a phase shift of $2\pi$ from the radial port 110c-1 to the radial port 110c-32. The excitation of the circular grating coupler 110 launches a first linear combination, e.g. data channel, of fiber modes 1 and 2 into the optical fiber 310. In various embodiments the circular grating coupler 110 and the star coupler 120 are configured to propagate both the TE and TM polarizations. For example, the star coupler 120 may be formed using a lower index-contrast slab waveguide, and the circular grating coupler 110 may be formed using sub-wavelength structures.

Analogously, the coupler 170 associated with the angular momentum −1 has ports designated $P_5$-$P_8$. A TE signal input to the $LP_{01b}$ port launches a second linear combination, e.g. data channel, of the fiber modes 1 and 2 into the optical fiber 310. However, the first and second linear combinations are orthogonal, so the data channels may be simultaneously transmitted over the fiber 310 and independently modulated.

TE signals input to the remaining ports of the PIC mode interface 150 result in different linear combinations of the basis set of fiber propagation modes, wherein each of the linear combinations is orthogonal to the others of the linear combinations. Thus, the data channels may be easily coupled to and from the optical fiber 310, and processed individually on the PIC.

FIG. 1C presents a second illustrative and nonlimiting embodiment of the PIC mode interface 150. This embodiment has a reduced number of optical couplers 170 relative to the embodiment of FIG. 1B. The reduction is made possible by the realization that because the $LP_{mn}$ modes are orthogonal and modes for which m=n are degenerate, linear combinations of the $LP_{mn}$ modes are also orthogonal. Because of this orthogonality, the couplers 170 may be omitted for those angular momentum channels that receive inputs from two $LP_{mn}$ modes. Thus, e.g. in FIG. 1C the 0 and ±1 angular momentum channels are implemented without the couplers 170. However, for those polarization channels only associated with a single $LP_{mn}$ mode, the couplers 170 are retained.

Figure 1D:
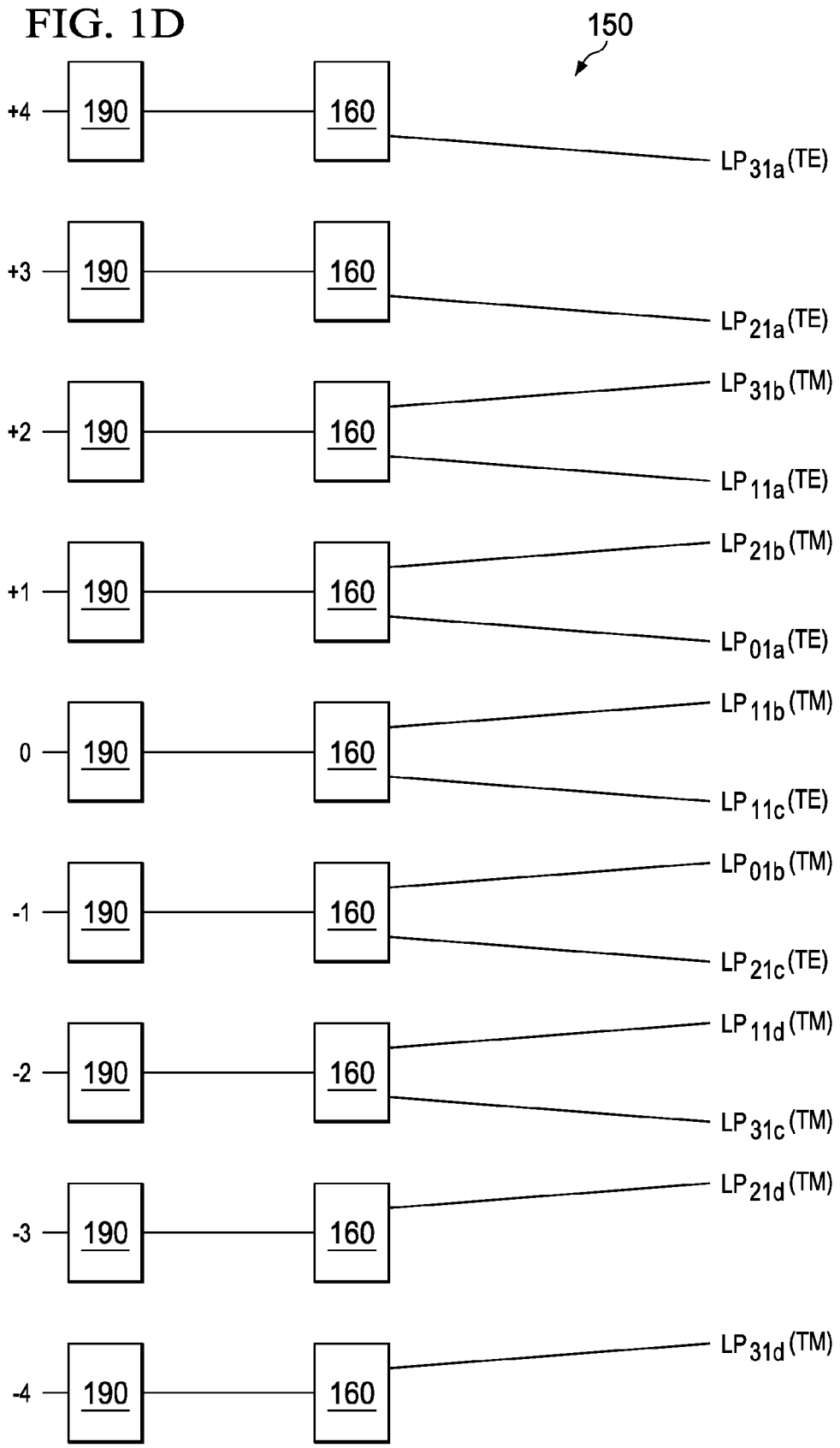
FIG. 1D illustrates the channel interface of FIG. 1A according to a third embodiment, wherein each angular momentum channel includes a PBS and a 45° rotator.

FIG. 1D presents a third illustrative and nonlimiting embodiment of the PIC mode interface 150. This embodiment implements each angular momentum channel using an instance of the PBS 160 and a 45° rotator 190 as illustrated. One signal input to the PBS 160 is oriented TE, and the other signal input is oriented TM. The combined signal is polarization-rotated by the rotator 190. This embodiment may be used advantageously in embodiments of the system 100 that include discrete optical components to implement optical processing of the $LP_{mn}$ signals. A PIC that includes the circular grating coupler 110 and the star coupler 120 may interface to discrete optical components using conventional techniques. The rotator 190 may in such embodiments be implemented by rotating an optical fiber connecting the PBS 160 to the star coupler 120.

The circular grating coupler 110, star coupler 120, waveguides 130 and 140, polarization beam splitters 160, optical couplers 170, polarization rotators 180 and 45° rotators 190 may be formed from a planar optical medium located over a planar surface of an optical substrate, e.g. a PIC. The optical medium may be any suitable material, e.g. a semiconductor such as silicon or InGaAsP, or a dielectric such as silicon nitride or silicon oxide. In some embodiments the star coupler 120 is formed from silicon nitride to reduce polarization dependence of the operation thereof. The description herein may refer to the optical medium as silicon without limitation. The substrate may include a semiconductor wafer, e.g. a silicon wafer, or a portion of a semiconductor wafer. The device 100 may further include an optical isolation layer, e.g. $SiO_2$, between the substrate and the circular grating coupler 110 and the radial ports 110c. Without limitation a silicon-on-insulator (SOI) wafer may provide a suitable substrate. The grating coupler and the radial ports may be ridge waveguides (sometimes also referred to as wire waveguides), channel, and/or rib waveguides, and may be covered by a dielectric layer such as $SiO_2$, $Si_3N_4$, or benzocyclobutene (BCB). In a nonlimiting embodiment the waveguides 130 and 140 may have a thickness of about 220 nm.

Figure 5:
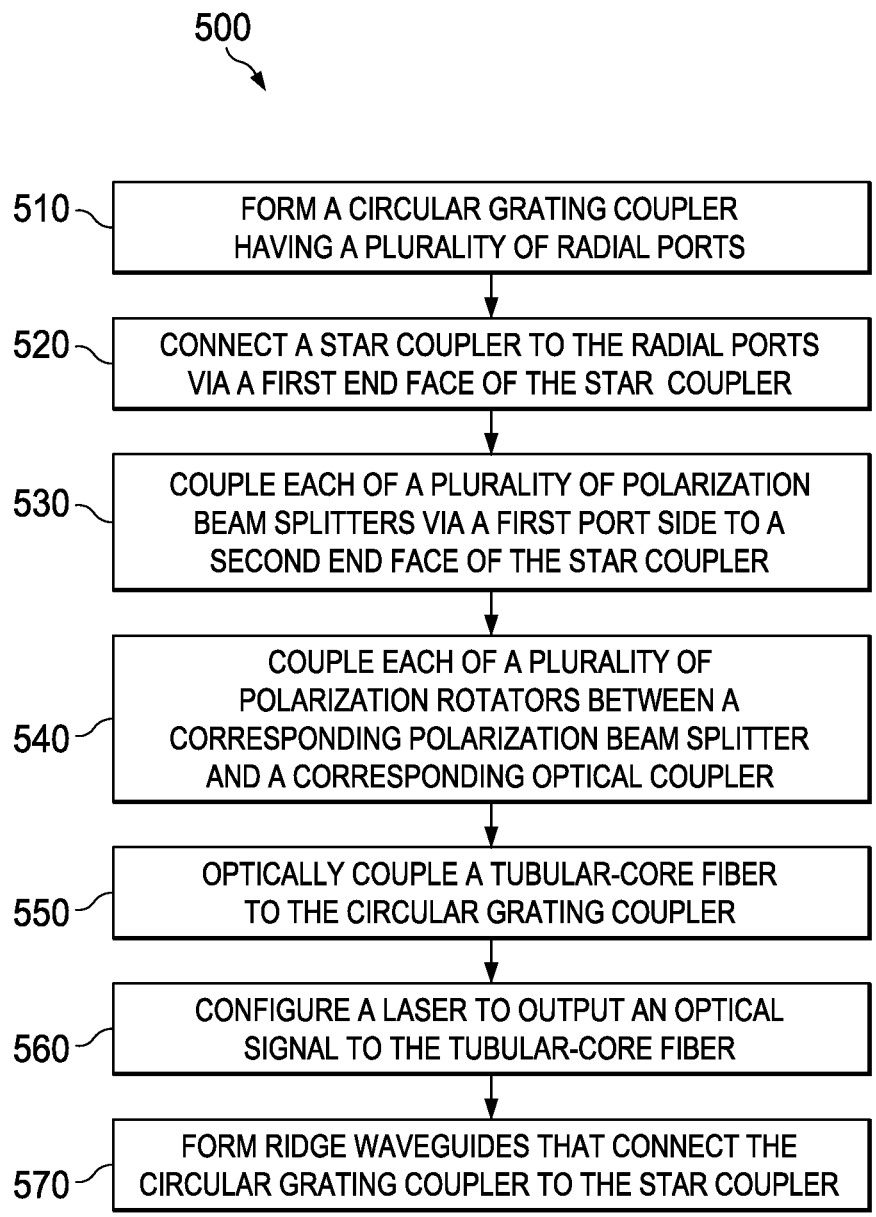
FIG. 5 presents a method according to various embodiments, e.g. for forming the optical system of FIGS. 1A-D, 2 and 3.

Turning to FIG. 5, a method 500 is presented, e.g. for manufacturing an optical device, e.g. the device 100. The steps of the method 500 are described without limitation by reference to elements previously described herein, e.g. in FIGS. 1A-1C, 2, 3, and 4. The steps of the method 500 may be performed in another order than the illustrated order, and in some embodiments may be omitted altogether and/or performed concurrently or in parallel groups. This method 500 is illustrated without limitation with some steps thereof being performed in parallel fashion, such as by concurrent processing on a common substrate. Other embodiments, e.g. those utilizing multiple substrates, may perform the steps partially or completely sequentially and in any order.

The method 500 begins with an entry 501. In a step 510 a circular grating coupler, e.g. the grating coupler 110, is formed that includes a plurality of radial ports, e.g. the radial ports 110c.

In a step 520 a star coupler, e.g. the star coupler 120, is connected to the radial ports via a first end face of the star coupler, e.g. the end face 120a. The star coupler may also be formed in a planar optical medium over a substrate, e.g. the same layer from which the grating coupler is formed.

In a step 530 each of a plurality of polarization beam splitters, e.g. instances of the PBS 160, is coupled via a first end to a second end face of the star coupler, e.g. the end face 210b. Each polarization beam splitter is also optically coupled via a second end to a port of an optical coupler, e.g. an instance of the optical coupler 170. The PBS and optical coupler may also be formed in the same optical medium from which the circular grating coupler is formed.

Any embodiment of the method 500 may include a step 540, in which each of a plurality of polarization rotators, e.g. the PR 180, is coupled between a corresponding one of the polarization beam splitters and a corresponding one of the optical couplers.

Any embodiment of the method 500 may include a step 550, in which a tubular-core optical fiber, e.g. the optical fiber 310, is optically coupled to the circular grating coupler. Any such embodiment may further include a step 560 in which a laser is configured to output an optical signal to the optical fiber. The laser may be configured to output an optical carrier in, e.g. the optical S, C or L bands. Any embodiment of the method may include a step 570 in which ridge waveguides are formed that connect the circular grating coupler to the star coupler.

Those skilled in the art to which this application relates will appreciate that other and further additions, deletions, substitutions and modifications may be made to the described embodiments.

What is claimed is:

1. An optical device, comprising:
   a star coupler having a port at a first end face;
   a polarization beam splitter optically coupled via a first side to said star coupler port, and optically coupled via a second side to a first port of an optical coupler;
   a polarization rotator optically coupled between said polarization beam splitter and a second port of said optical coupler; and
   a circular grating coupler having a plurality of radial ports coupled to said star coupler at a second end face.

2. The optical device of claim 1 wherein the polarization beam splitter and polarization rotator are provided by a single component.

3. The optical device of claim 1, wherein said polarization beam splitter is optically coupled via said second side directly to said first port.

4. The optical device of claim 1, further comprising a laser coupled to said circular grating coupler via a tubular-core optical fiber.

5. The optical device of claim 1, wherein one or more of said star coupler, polarization beam splitter and polarization rotator are formed in a planar silicon layer over a silicon substrate.

6. The optical device of claim 1, wherein said polarization beam splitter is one of a first plurality of polarization beam splitters connected to said star coupler, said optical coupler is one of a plurality of optical couplers each being connected to a corresponding one of said polarization beam splitters of said first plurality, and further comprising a second plurality of polarization beam splitters connected to said star coupler, wherein a total number of said first and second pluralities of polarization beam splitters exceeds a number of said optical couplers.

7. An optical device, comprising:
   a circular grating coupler having a plurality of radial ports;
   a star coupler connected to said radial ports via a first end face; and
   a plurality of polarization beam splitters each being optically coupled via a first end to a second end face of said star coupler, each polarization beam splitter being optically coupled via a second end to one of a corresponding plurality of optical couplers.

8. The optical device of claim 7, further comprising a plurality of polarization rotators, each polarization rotator being coupled to a corresponding polarization beam splitter and a corresponding optical coupler.

9. The optical device of claim 7 wherein the polarization beam splitter is configured to rotate the polarization of an optical signal propagating therethrough.

10. The optical device of claim 7, further comprising a tubular-core fiber optically coupled to said circular grating coupler.

11. The optical device of claim 10, further comprising a laser configured to couple an optical signal to said tubular-core fiber.

12. The optical device of claim 11, wherein said laser is further configured to provide light in an optical S, C or L band.

13. The optical device of claim 7, wherein said circular grating coupler, star couplers, and polarization beam splitters are formed from silicon.

14. The optical device of claim 7, further comprising ridge waveguides connecting said circular grating coupler to said star coupler.

15. The optical device of claim 10, wherein multiple propagation modes of said fiber are mapped to a single angular momentum mode of said circular grating coupler.

16. The optical device of claim 7, wherein said plurality of polarization beam splitters is a first plurality of polarization beam splitters, and further comprising a second plurality of polarization beam splitters connected to said second end face, wherein a total number of said first and second pluralities of polarization beam splitters exceeds a number of said optical couplers.

17. A method, comprising:
   forming a circular grating coupler having a plurality of radial ports;
   forming a star coupler connected via a first end face to said radial ports; and
   forming a plurality of polarization beam splitters such that each of said polarization beam splitters is coupled via a first end to a second end face of said star coupler, and each polarization beam splitter is optically coupled via a second end to an optical coupler.

18. The method of claim 17, further comprising connecting each of a plurality of polarization rotators between a corresponding one of said polarization beam splitters and a corresponding one of said optical couplers.

19. The method of claim 17, wherein ridge waveguides connect said circular grating coupler to said star coupler.

20. The method of claim 17, wherein:
   said plurality of polarization beam splitters is a first plurality of polarization beam splitters;
   a second plurality of polarization beam splitters is connected to said second end face; and
   a total number of said first and second pluralities of polarization beam splitters exceeds a number of said optical couplers.

21. An optical device, comprising:
   a star coupler having an end face;
   a circular grating coupler having $2^n$ input ports; and
   a plurality of waveguides connecting said end face to said circular grating coupler,
   wherein said waveguides are routed in groups having an integer multiple of two associated members, with the number of associated waveguides in each group sequentially decreasing from said end face to said circular grating coupler input ports.

* * * * *